United States Patent
Sadil et al.

(10) Patent No.: US 10,648,670 B2
(45) Date of Patent: May 12, 2020

(54) SWIRLER ASSEMBLY FOR A TURBINE ENGINE

(71) Applicant: United Technologies Corporation, Hartford, CT (US)

(72) Inventors: Andreas Sadil, Newington, CT (US); Russell B. Hanson, Jupiter, FL (US); Raymond Lamoureux, Marlborough, CT (US); Dave J. Hyland, Portland, CT (US)

(73) Assignee: United Technologies Corporation, Farmington, CT (US)

( * ) Notice: Subject to any disclaimer, the term of this patent is extended or adjusted under 35 U.S.C. 154(b) by 394 days.

(21) Appl. No.: 14/827,895

(22) Filed: Aug. 17, 2015

(65) Prior Publication Data

US 2016/0245520 A1     Aug. 25, 2016

Related U.S. Application Data

(60) Provisional application No. 62/065,236, filed on Oct. 17, 2014.

(51) Int. Cl.
| | |
|---|---|
| *F23R 3/14* | (2006.01) |
| *F23R 3/60* | (2006.01) |
| *F23R 3/28* | (2006.01) |
| *F02C 7/20* | (2006.01) |

(52) U.S. Cl.
CPC ............... *F23R 3/14* (2013.01); *F23R 3/283* (2013.01); *F23R 3/60* (2013.01); *F02C 7/20* (2013.01)

(58) Field of Classification Search
CPC .... F23R 3/14; F23R 3/283; F23R 3/60; F02C 7/20
See application file for complete search history.

(56) References Cited

U.S. PATENT DOCUMENTS

| | | | | |
|---|---|---|---|---|
| 5,197,289 A | * | 3/1993 | Glevicky | F23R 3/04 60/746 |
| 5,239,832 A | | 8/1993 | Koshoffer et al. | |
| 5,996,335 A | * | 12/1999 | Ebel | F23R 3/10 60/740 |
| 6,412,272 B1 | * | 7/2002 | Titterton, III | F23R 3/283 60/39.37 |
| 7,870,737 B2 | | 1/2011 | Snyder | |
| 8,312,724 B2 | | 11/2012 | Dai et al. | |
| 8,347,630 B2 | | 1/2013 | Lovett et al. | |
| 8,640,463 B2 | | 2/2014 | Cheung | |
| 8,689,563 B2 | | 4/2014 | Low | |
| 8,726,667 B2 | | 5/2014 | Tanner et al. | |
| 8,789,374 B2 | | 7/2014 | Hoke | |
| 2003/0213250 A1 | * | 11/2003 | Pacheco-Tougas | F23R 3/002 60/752 |
| 2013/0199194 A1 | | 8/2013 | Carlisle | |

OTHER PUBLICATIONS

EP Search Report dated Feb. 26, 2016.

* cited by examiner

*Primary Examiner* — Todd E Manahan
*Assistant Examiner* — Katheryn A Malatek
(74) *Attorney, Agent, or Firm* — Getz Balich LLC

(57) ABSTRACT

An assembly for a turbine engine includes a combustor bulkhead, a swirler and a mounting strap. The swirler includes a mounting lug and a tubular swirler body that extends along an axis. The mounting lug projects radially out from the swirler body. The mounting strap is attached to the combustor bulkhead. The mounting lug is axially restrained between the combustor bulkhead and the mounting strap.

19 Claims, 8 Drawing Sheets

SWIRLER ASSEMBLY FOR A TURBINE ENGINE

This application claims priority to U.S. Patent Appln. No. 62/065,236 filed Oct. 17, 2014.

This invention was made with government support under Contract No. NNC10BA12B awarded by the United States National Aeronautical and Space Administration (NASA). The government may have certain rights in the invention.

BACKGROUND OF THE INVENTION

1. Technical Field

This disclosure relates generally to a turbine engine and, more particularly, to a swirler assembly for a turbine engine.

2. Background Information

A combustor for a turbine engine typically includes a plurality of fuel injectors respectively mated with a plurality of swirlers. The fuel injectors inject fuel into a combustion chamber of the combustor. The swirlers facilitate mixing compressed air with the injected fuel to provide a fuel air mixture for combustion.

Typically, the swirlers are fixedly bonded (e.g., brazed) to a bulkhead of the combustor. With such a configuration, it may be difficult, time consuming and/or expensive to remove the swirlers or portions of the bulkhead for service or replacement. There is a need in the art therefore for an improved swirler and method for mounting a swirler.

SUMMARY OF THE DISCLOSURE

According to an aspect of the invention, an assembly is provided for a turbine engine. This turbine engine assembly includes a combustor bulkhead, a swirler and a mounting strap. The swirler includes a mounting lug and a tubular swirler body extending along an axis. The mounting lug projects radially out from the swirler body. The mounting strap is attached to the combustor bulkhead. The mounting lug is axially restrained between the combustor bulkhead and the mounting strap.

According to another aspect of the invention, an assembly is provided for a turbine engine with a combustor bulkhead. This turbine engine assembly includes a swirler and a mounting strap. The swirler includes a mounting lug and a tubular swirler body extending along an axis. The mounting lug projects radially out from the swirler body. The mounting strap includes an intermediate portion laterally between opposing end portions. The intermediate portion is configured for axially restraining the mounting lug. Each of the end portions is configured for attaching to the combustor bulkhead.

According to another aspect of the invention, another assembly is provided for a turbine engine. This turbine engine assembly includes a combustor bulkhead and a swirler mated with an aperture in the combustor bulkhead. The combustor bulkhead includes a shell and a heat shield attached to the shell by a plurality of fasteners. The swirler is attached to the combustor bulkhead by one or more of the fasteners.

The fasteners may include a plurality of heat shield studs.

A mounting strap may be attached to the combustor bulkhead by one or more of the fasteners. The swirler may include a mounting lug axially between the mounting strap and the shell.

The mounting strap may include an intermediate portion between opposing end portions. The intermediate portion may axially engage the mounting lug. The end portions may be respectively attached to the combustor bulkhead by a plurality of fasteners.

At least one of the fasteners may be or otherwise include a heat shield stud.

A spacer may be disposed between the combustor bulkhead and one of the end portions.

The mounting strap may fixedly secure the swirler to the combustor bulkhead. The mounting strap, for example, may preload the mounting lug towards the combustor bulkhead.

The swirler body may be configured to laterally float between the combustor bulkhead and the mounting strap.

The swirler may include an anti-rotation feature configured to engage the mounting strap and limit or substantially prevent rotation of the swirler body about the axis.

The mounting strap may include one or more cooling apertures extending therethrough.

A cooling channel may extend laterally at least partially into the mounting lug and axially between the mounting lug and the combustor bulkhead.

A second mounting strap may be attached to the combustor bulkhead. The swirler may include a second mounting lug projecting radially out from the swirler body. The second mounting lug may be axially restrained between the combustor bulkhead and the second mounting strap.

A fuel injector may be mated with the swirler.

The swirler may include a slider plate mated with the fuel injector.

A second mounting strap may include a second intermediate portion laterally between opposing second end portions. The second intermediate portion may be configured for axially restraining a second mounting lug. Each of the second end portions may be configured for attaching to the combustor bulkhead. The second mounting lug may project radially out from the swirler body.

Each of the end portions may be configured to receive a fastener.

One or more spacers may be configured for axially locating the mounting strap relative to the combustor bulkhead.

The swirler may include an anti-rotation feature configured to engage the mounting strap and limit or substantially prevent rotation of the swirler body about the axis.

The mounting strap may include a surface configured to engage the mounting lug and limit or substantially prevent lateral movement of the swirler body.

An intermediate portion of the mounting strap may include a projection that extends axially to the bulkhead.

The foregoing features and the operation of the invention will become more apparent in light of the following description and the accompanying drawings.

DETAILED DESCRIPTION OF THE INVENTION

Figure 1:
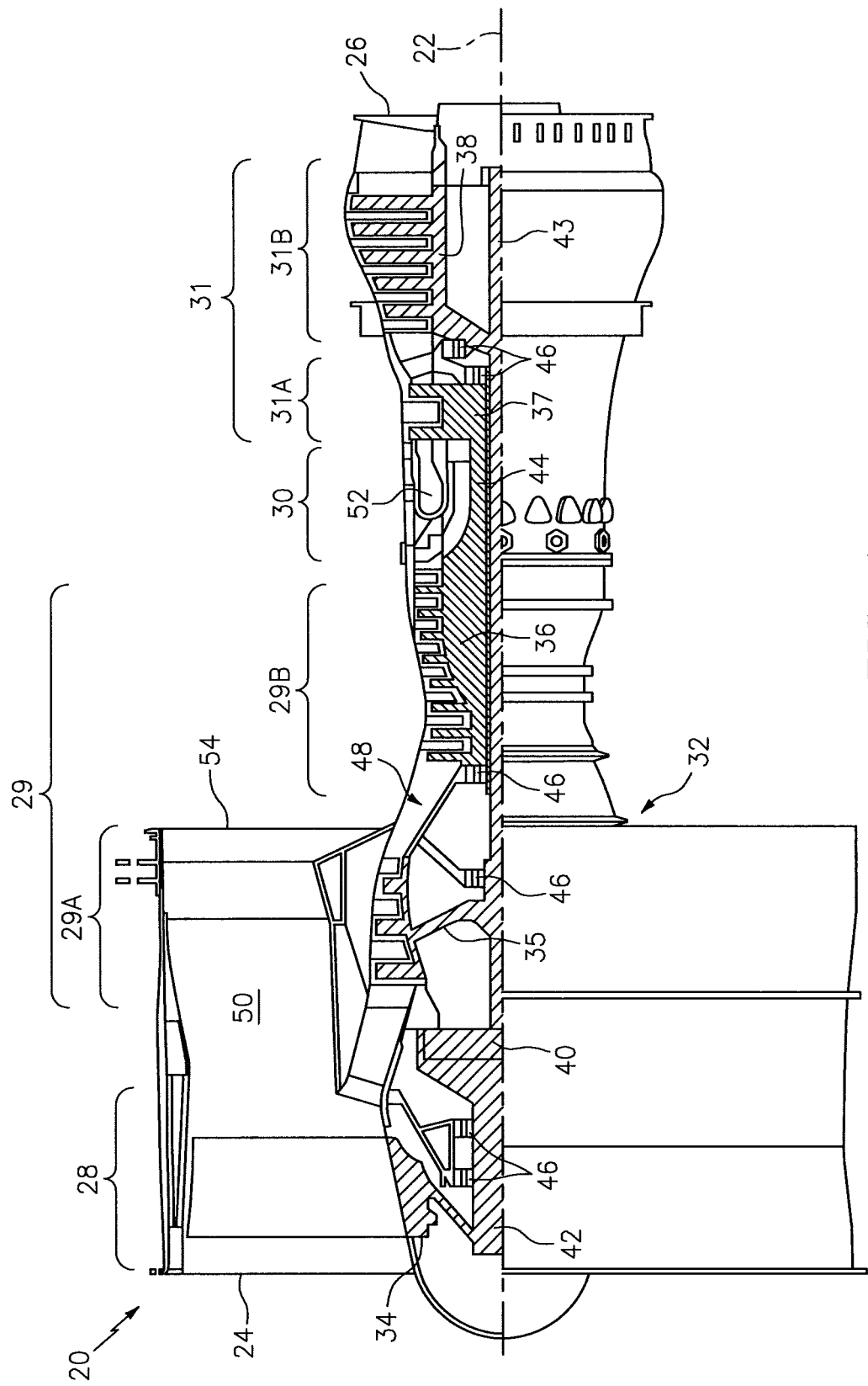
FIG. 1 is a side cutaway illustration of a geared turbine engine.

FIG. 1 is a side cutaway illustration of a geared turbine engine 20. This turbine engine 20 extends along an axial centerline 22 between an upstream airflow inlet 24 and a downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31 are arranged sequentially along the centerline 22 within an engine housing 32. Each of the engine sections 28, 29A, 29B, 31A and 31B includes a respective rotor 34-38. Each of these rotors 34-38 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 34 is connected to a gear train 40, for example, through a fan shaft 42. The gear train 40 and the LPC rotor 35 are connected to and driven by the LPT rotor 38 through a low speed shaft 43. The HPC rotor 36 is connected to and driven by the HPT rotor 37 through a high speed shaft 44. The shafts 42-44 are rotatably supported by a plurality of bearings 46; e.g., rolling element and/or thrust bearings. Each of these bearings 46 is connected to the engine housing 32 by at least one stationary structure such as, for example, an annular support strut.

During operation, air enters the turbine engine 20 through the airflow inlet 24, and is directed through the fan section 28 and into a core gas path 48 and a bypass gas path 50. The air within the core gas path 48 may be referred to as "core air". The air within the bypass gas path 50 may be referred to as "bypass air". The core air is directed through the engine sections 29-31, and exits the turbine engine 20 through the airflow exhaust 26 to provide forward engine thrust. Within the combustor section 30, fuel is injected into a combustion chamber 52 and mixed with at least a portion of the core air. This fuel-core air mixture is ignited to power the turbine engine 20. The bypass air is directed through the bypass gas path 50 and out of the turbine engine 20 through a bypass nozzle 54 to provide additional forward engine thrust. Alternatively, at least some of the bypass air may be directed out of the turbine engine 20 through a thrust reverser to provide reverse engine thrust.

Figure 2:
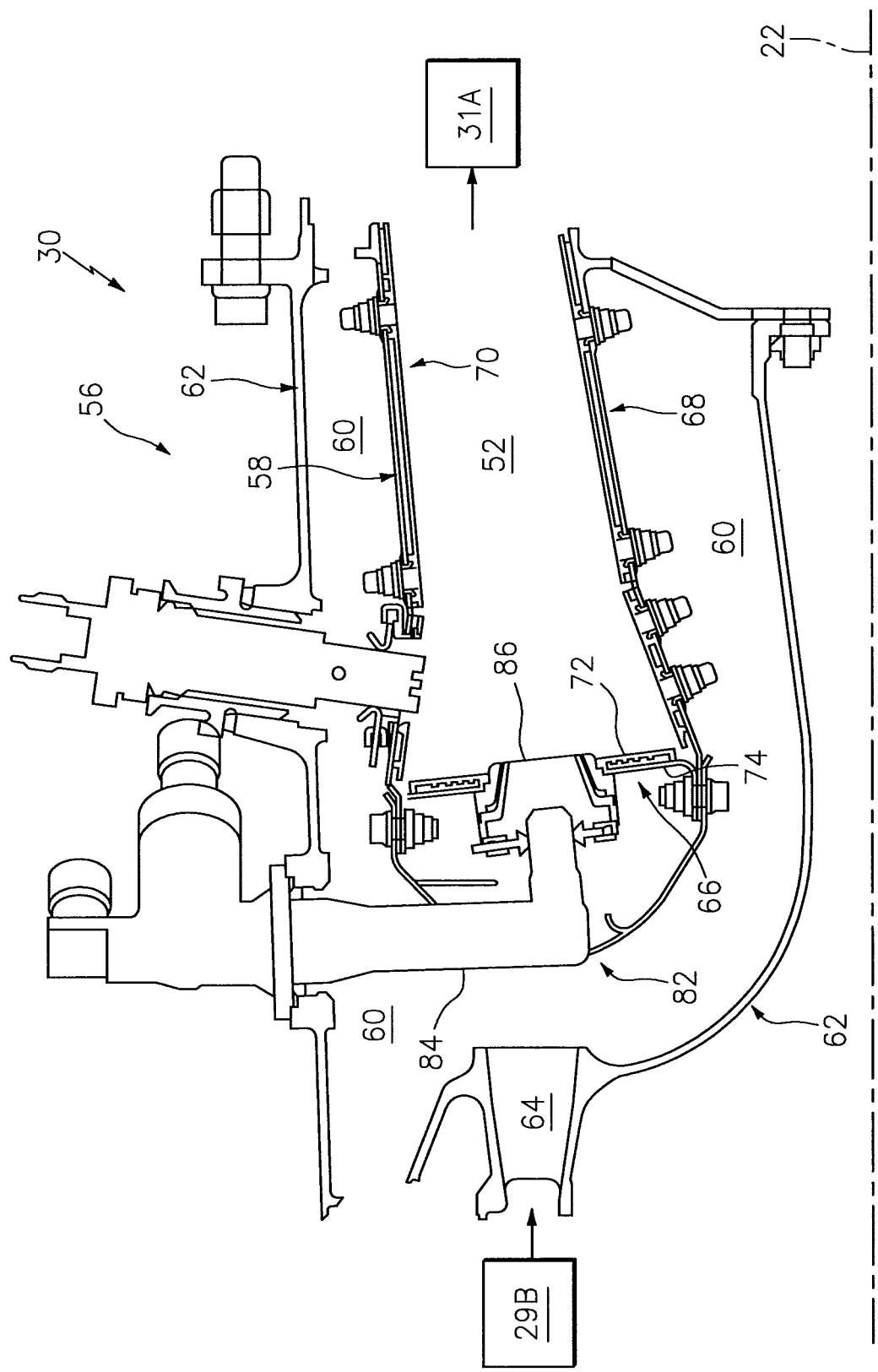
FIG. 2 is a partial side cutaway illustration of an assembly for the turbine engine.

FIG. 2 illustrates an assembly 56 of the turbine engine 20. This turbine engine assembly 56 includes a combustor 58 arranged within a combustor plenum 60 of a diffuser module 62. This combustor plenum 60 receives compressed core air from the HPC section 29B through an inlet passage 64 of the diffuser module 62. The combustor plenum 60 provides the received core air to the combustor as described below in further detail.

The combustor 58 may be configured as an annular floating wall combustor. The combustor 58 of FIG. 2, for example, includes an annular combustor bulkhead 66, a tubular combustor inner wall 68 and a tubular combustor outer wall 70. The bulkhead 66 extends radially between and is connected to the inner wall 68 and the outer wall 70. Each wall 68, 70 extends axially along the centerline 22 from the bulkhead 66 towards the HPT section 31A, thereby defining the combustion chamber 52. Each combustor component 66, 68 and 70 may be a multi-walled structure that includes, for example, a heat shield (e.g., 72) attached to a shell (e.g., 74) by a plurality of fasteners (e.g., 76, see FIGS. 3-5) such as, but not limited to, heat shield studs 78 respectively mated with nuts 80 (see FIGS. 3-5). The shell (e.g., 74) and/or the heat shield (e.g., 72) may each be formed from a plurality of discrete panels, or alternatively from a unitary tubular or annular body. One or more of the components 66, 68 and/or 70, of course, may alternatively each be a single walled structure; e.g., comprise a single liner.

The turbine engine assembly 56 also includes one or more fuel injector assemblies 82 arranged circumferentially around the centerline 22. Each of these fuel injector assemblies 82 includes a fuel injector 84 mated with a swirler 86. The fuel injector 84 injects the fuel into the combustion chamber 52. The swirler 86 swirls and/or turbulates a portion of the core air received from the combustor plenum 60 and direct this portion of the core air into the combustion chamber 52 in a manner that facilitates mixing the core air with the injected fuel. Quench apertures (not shown) in the inner and/or the outer walls 68 and 70 may direct additional core air into the combustion chamber 52 for combustion. Additional core air may also or alternatively be directed (e.g., effused) into the combustion chamber 52 through cooling apertures (not shown) in the inner and/or the outer walls 68 and 70.

Figure 3:
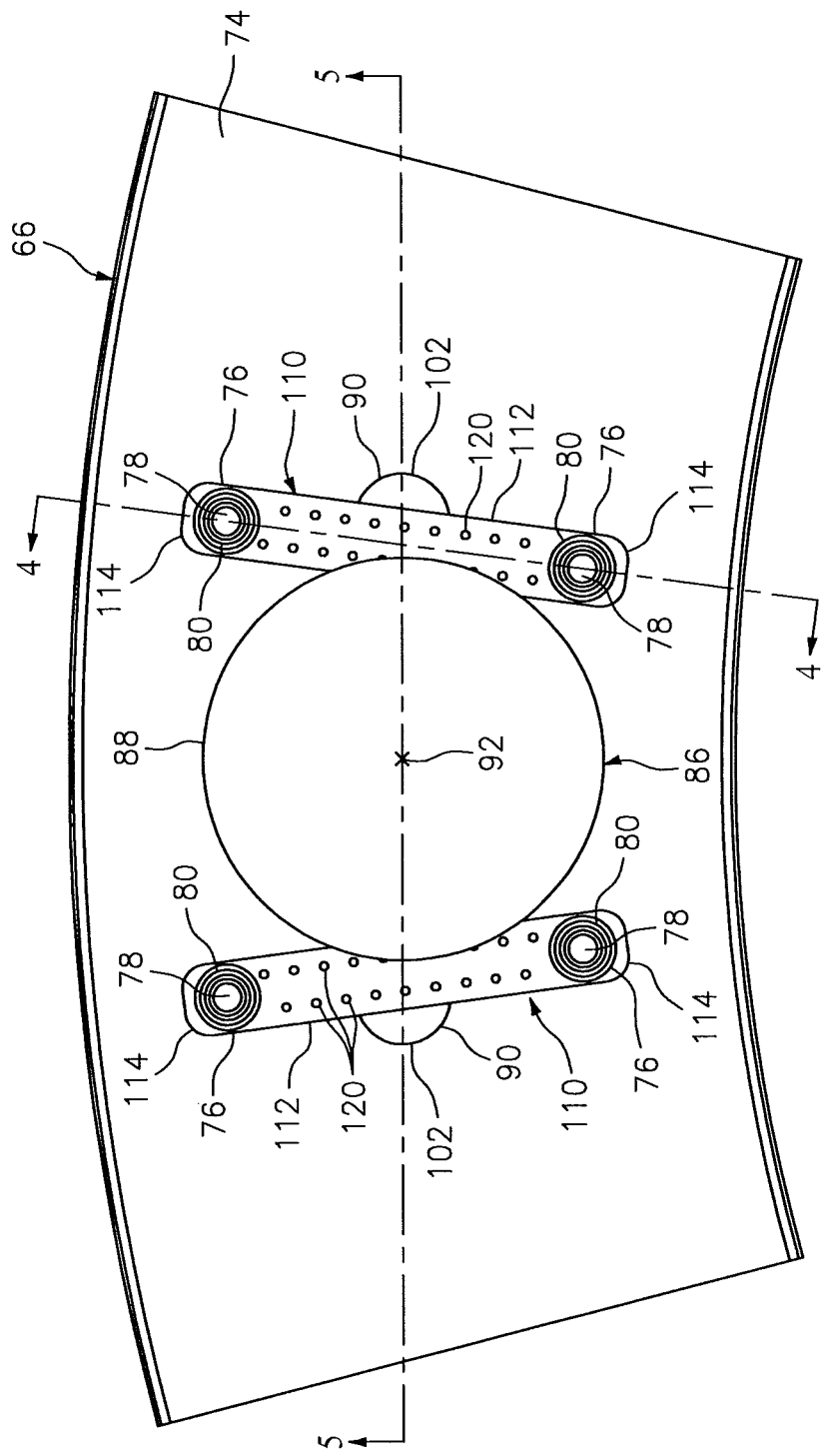
FIG. 3 is an illustration of an upstream side portion of a combustor bulkhead configured with a swirler.
Figure 4:
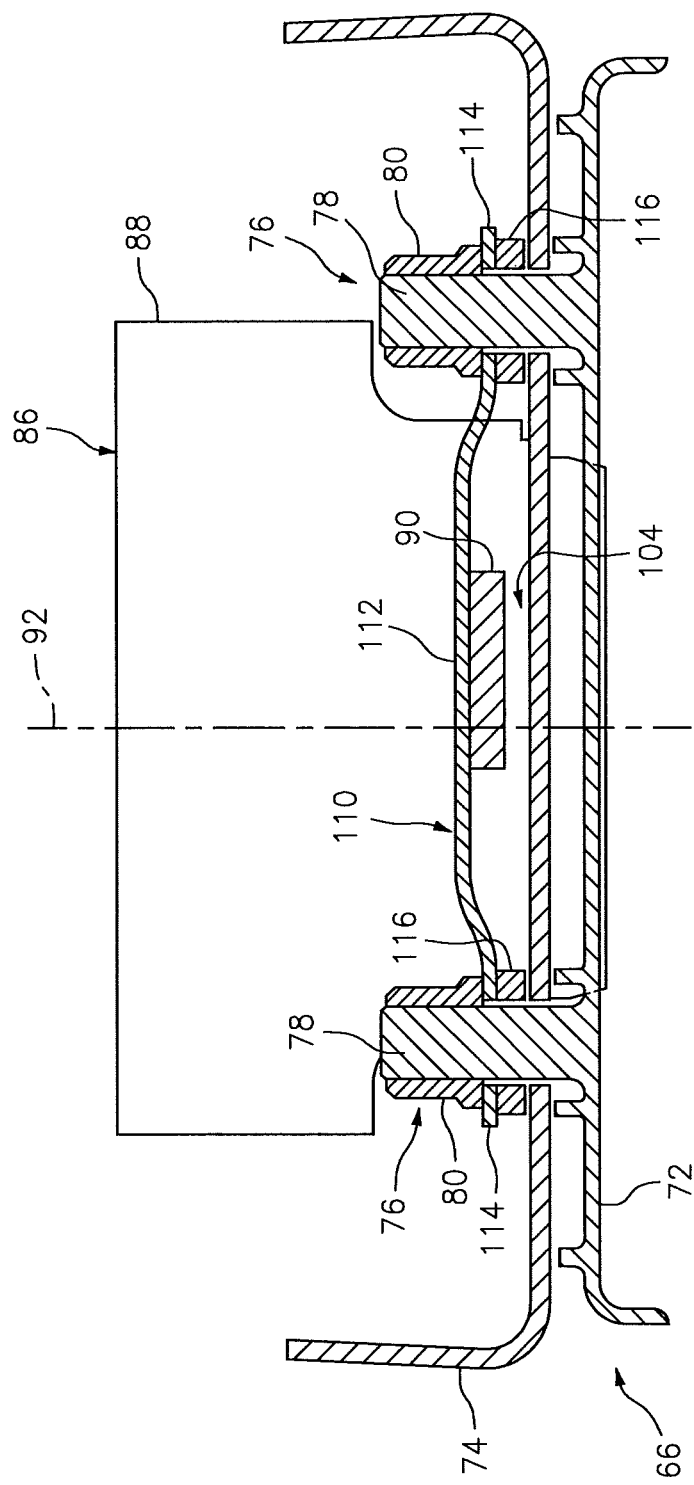
FIG. 4 is side sectional illustration of the combustor bulkhead and swirler of FIG. 3 along section line 4-4.
Figure 5:
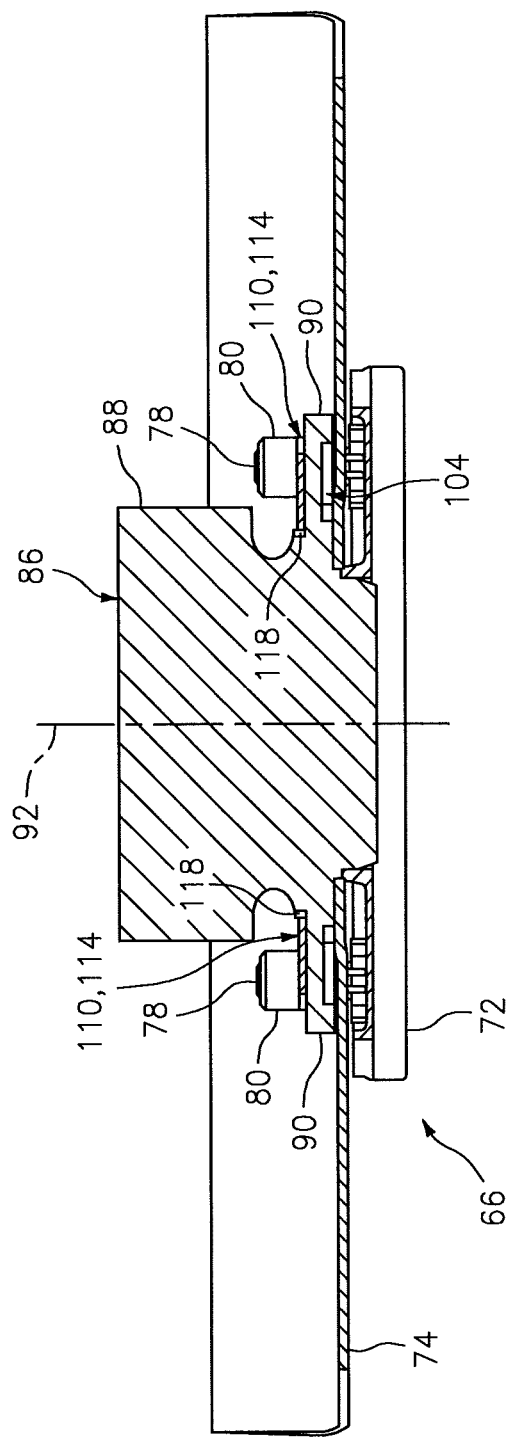
FIG. 5 is another sectional illustration of the combustor bulkhead and swirler of FIG. 3 along section line 5-5.

FIG. 3 illustrates a portion of an upstream side of the bulkhead 66 with an exemplary one of the swirlers 86. FIG. 4 illustrates the bulkhead 66 and the swirler 86 in FIG. 3 along section line 4-4. FIG. 5 illustrates the bulkhead 66 and the swirler 86 in FIG. 3 along section line 5-5. It is worth noting, the swirler 86 is shown in block diagram form for ease of illustration. Additional swirler 86 details are shown, however, in FIG. 6 which is discussed below in further detail.

Referring to FIGS. 3-5, each swirler 86 includes a tubular swirler body 88 and one or more mounting lugs 90. The swirler body 88 extends along a respective axis 92, which may be acute to (or parallel with) the centerline 22 as shown in FIG. 2.

Figure 6:
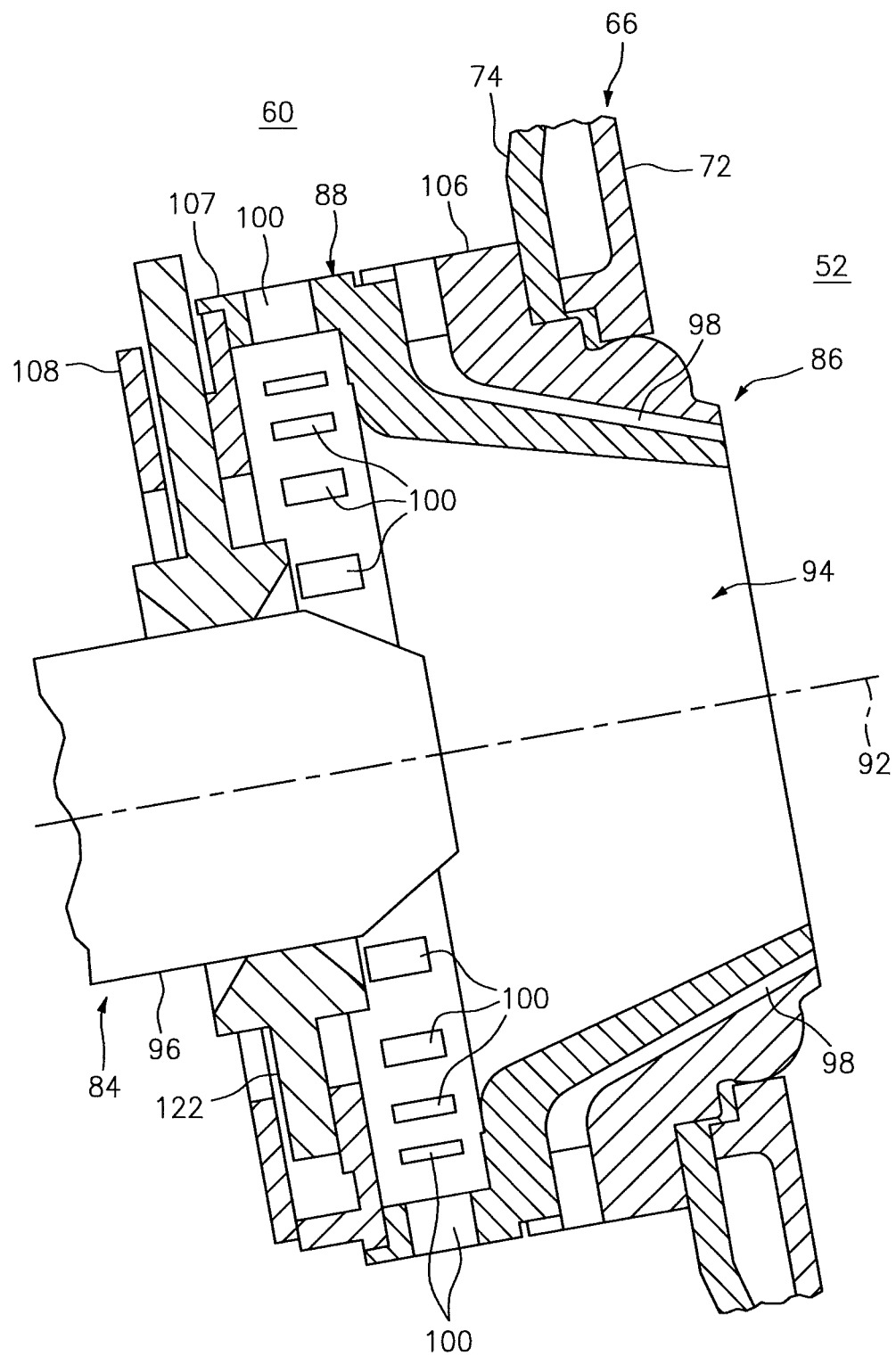
FIG. 6 is an enlarged view of the turbine engine assembly of FIG. 2.

Referring to FIG. 6, the swirler body 88 form an inner bore 94 along the axis 92 configured to receive a nozzle 96 of a respective one of the fuel injectors 84. One or more apertures 98 and 100 (e.g., orifices, flow passages, channels, etc.) extend into, through and/or out of the swirler body 88, which apertures 98 and 100 fluidly couple the plenum 60 to the combustion chamber 52. These apertures 98 and 100 are disposed circumferentially about the axis 92 and the inner bore 94. The apertures 98 and 100 are configured to provide and direct the swirled and/or turbulated air into the combustion chamber 52 for mixing with the fuel injected by the nozzle 96.

Referring again to FIGS. 3-5, the mounting lugs 90 are arranged circumferentially about the swirler body 88. The mounting lugs 90, for example, may be arranged on (e.g., diametrically) opposing sides of the swirler body 88 and/or be configured as substantially mirror images of one another. The mounting lugs 90 may also be arranged to axially locate the swirler body 88 relative to the bulkhead 66; e.g., be configured to butt against the bulkhead shell 74. The present disclosure, however, is not limited to any particular mounting lug spatial arrangement.

Each of the mounting lugs 90 projects radially (relative to the axis 92) out from the swirler body 88 to a radial outer distal end 102. One or more of the mounting lugs 90 may include or at least partially form at least one cooling channel 104. Each mounting lug 90 of FIG. 5, for example, foul's a respective cooling channel 104 with the bulkhead shell 74. This cooling channel 104 extends at least laterally (e.g., in a plane perpendicular to the axis 92) into or through the mounting lug 90. The cooling channel 104 also extends axially between the mounting lug 90 and the bulkhead shell 74. The cooling channel 104 is configured to circulate core air from the plenum 60 about the respective mounting lug 90 and thereby cool the lug 90. The present disclosure, however, is not limited to the foregoing exemplary cooling channel 104 configuration. One or more of the mounting lugs 90, for example, may also or alternatively include at least one axially extending cooling channel or aperture.

The swirler body 88 may be formed with the mounting lugs 90 as a single unitary body as illustrated in FIGS. 3-5. Alternatively, the swirler body 88 may include a plurality of segments 106-108 as illustrated in FIG. 6. These swirler body segments 106-108 may be mechanically fastened, welded, brazed, adhered and/or otherwise attached to one another to form the swirler body 88. In the embodiment of FIG. 6, although not shown, the mounting lugs 90 are formed integral with the swirler body segment 106. The present disclosure, however, is not limited to the foregoing exemplary swirler body and mounting lug formations.

Referring to FIGS. 3-5, each swirler 86 is attached to the bulkhead 66 by one or more of the fasteners 76; e.g., the heat shield studs 78 mated with the nuts 80. The swirler 86 shown in FIGS. 3-5, for example, is removably attached to the bulkhead 66 by one or more mounting straps 110, which are removably attached to the bulkhead 66 by one or more of the fasteners 76. More particularly, each mounting strap 110 includes an intermediate portion 112 between opposing end portions 114. The intermediate portion 112 overlaps and engages (e.g., contacts and presses against) a respective one of the mounting lugs 90. Each of the end portions 114 is mechanically fastened to the bulkhead 66 by a respective one of the fasteners 76. In this manner, each mounting lug 90 is axially secured (e.g., sandwiched) between a respective one of the mounting straps 110 and the bulkhead shell 74.

Each mounting strap 110 may be preloaded against its respective mounting lug 90, which may aid to fixedly secure and hold the swirler body 88 in a stationary position. Spacers 116 (e.g., washers; see FIG. 4), for example, may be disposed between the end portions 114 and the bulkhead shell 74. The height of these spacers 116 may be selected such that the end portions 114 are pulled towards the bulkhead 66 (e.g., the mounting strap 110 bows around the mounting lug 90) when the nuts 80 are tightened. The spacers 116 may be configured as discrete units as illustrated in FIG. 4. Alternatively, one or more of the spacers 116 may each be configured integral with the mounting strap 110 (see FIGS. 8 and 9) or the bulkhead shell 74.

Each mounting strap 110 and, more particularly, the intermediate portion 112 may abut against a shoulder 118 configured in the respective mounting lug 90 or the swirler body 88. The mounting strap 110 and the shoulder 118 together may form an anti-rotation feature configured to substantially prevent (or limit) rotation of the swirler 86 about its axis 92. Of course, various other anti-rotation feature types and configurations are known in the art, and the present disclosure is not limited to any particular ones thereof.

Referring to FIG. 3, each mounting strap 110 may include one or more cooling apertures 120; e.g., orifices, flow passages, channels, etc. The mounting straps 110 of FIG. 3, for example, each include a plurality of cooling orifices. Each of these cooling orifices 120 extend axially, relative to the axis 92 through the respective mounting strap 110. The cooling orifices 120 are configured to circulate core air from the plenum 60 through and about the respective mounting strap 110 and thereby cool the strap 110. The present disclosure, of course, is not limited to the foregoing exemplary cooling aperture configuration. One or more of the mounting straps 110, for example, could also or alternatively each include at least one laterally extending cooling aperture; e.g., orifice or channel.

Figure 7:
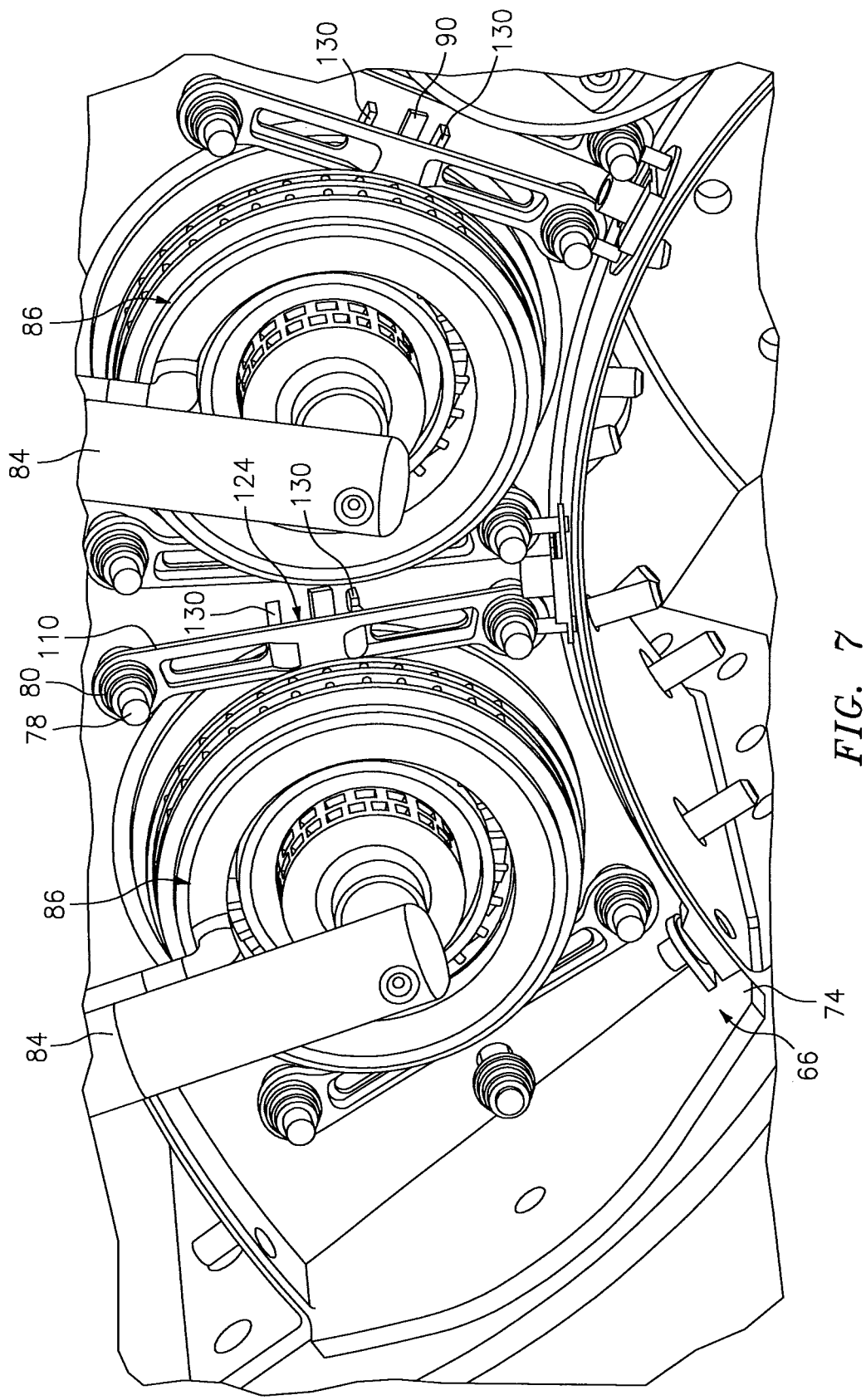
FIG. 7 is a partial perspective illustration of another assembly for the turbine engine of FIG. 1.
Figure 8:
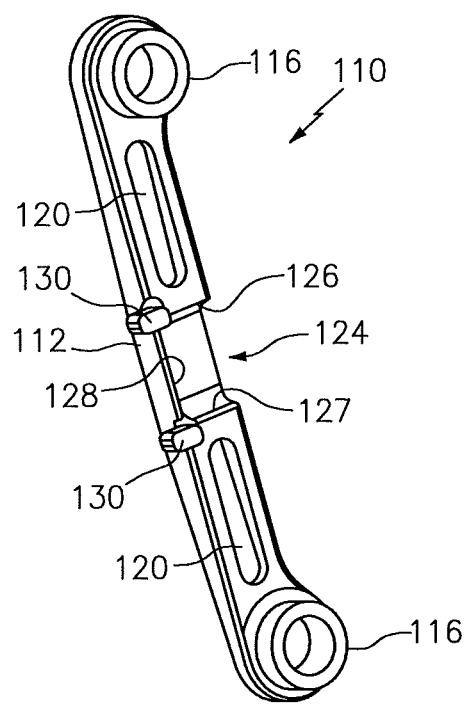
FIGS. 8 and 9 are perspective illustrations of a strap for mounting a swirler to a combustor bulkhead.
Figure 9:
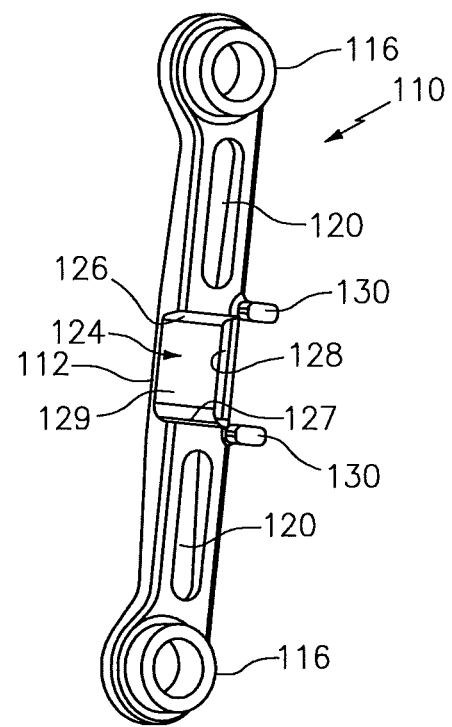

In some embodiments, referring to FIG. 6, the swirler 86 may include a slide plate 122 (or bearing plate). This slide plate 122 is configured to laterally move (e.g., slide) relative to the swirler body 88 and thereby enable lateral shifts between the nozzle 96 and the swirler body 88. Such lateral shifts may be caused by engine vibrations and/or variations in thermally induced growth. The slide plate 122 may also or alternatively be configured to axially move (e.g., slide) along the nozzle 96. Alternatively, the swirler 86 may be configured without a slider plate as shown in FIG. 7. In such embodiments, however, the swirler 86 itself may be configured as a slider plate. For example, each mounting strap 110 may include a notch 124 (or channel) in its intermediate portion 112 as shown in FIGS. 8 and 9. Surfaces 126-129 defining the notch 124 may be arranged to provide limited movement of a respective one of the mounting lugs 90. The surfaces 126 and 127, for example, are configured for limiting rotational movement of the respective mounting lug 90 and, thus, the swirler body 88. The surface 128 is configured to limit radial movement of the respective mounting lug 90 and, thus, the swirler body 88. The surface 129 is configured to limit axial movement of the respective mounting lug 90 and, thus, the swirler body 88. Each mounting strap 110 may also or alternatively be configured with one or more projections 130. These projections 130 may be arranged on opposing sides of the notch 124 and extend axially to the bulkhead shell 74. The projections 130 may be axially sized to maintain an axial clearance between the surface 129 and the bulkhead shell 74 and thereby prevent axial compression (or over-compression) of the mounting lug 90. With this configuration, the mounting lugs 90 and, thus, the swirler body 88 may laterally and/or axially float between the bulkhead shell 74 and the mounting straps 110.

The terms "upstream", "downstream", "inner" and "outer" are used to orientate the components of the turbine engine assembly 56 described above relative to the turbine engine 20 and its centerline 22. A person of skill in the art will recognize, however, one or more of these components may be utilized in other orientations than those described above. The present invention therefore is not limited to any particular turbine engine assembly 56 spatial orientations.

The turbine engine assembly 56 may be included in various turbine engines other than the one described above. The turbine engine assembly 56, for example, may be included in a geared turbine engine where a gear train connects one or more shafts to one or more rotors in a fan section, a compressor section and/or any other engine section. Alternatively, the turbine engine assembly 56 may be included in a turbine engine configured without a gear train. The turbine engine assembly 56 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for a turbine engine, comprising:
   a combustor bulkhead;
   a swirler including a mounting lug and a tubular swirler body extending along an axis, the mounting lug projecting radially out from the swirler body; and
   a mounting strap attached to the combustor bulkhead, wherein the mounting lug is axially restrained between the combustor bulkhead and the mounting strap;
   wherein the mounting strap fixedly secures the swirler to the combustor bulkhead such that the tubular swirler body does not move in any direction relative to the combustor bulkhead.

2. The assembly of claim 1, wherein the mounting strap includes an intermediate portion between opposing end portions, the intermediate portion axially engages the mounting lug, and the opposing end portions are respectively attached to the combustor bulkhead by a plurality of fasteners.

3. The assembly of claim 2, wherein at least one of the fasteners comprises a heat shield stud.

4. The assembly of claim 2, further comprising a spacer disposed between the combustor bulkhead and one of the opposing end portions.

5. The assembly of claim 1, wherein the mounting strap is preloaded against the mounting lug thereby fixedly securing the swirler to the combustor bulkhead.

6. The assembly of claim 1, wherein the swirler includes an anti-rotation feature configured to engage the mounting strap and limit or substantially prevent rotation of the swirler body about the axis.

7. The assembly of claim 1, wherein the mounting strap includes a surface configured to engage the mounting lug.

8. The assembly of claim 1, wherein an intermediate portion of the mounting strap includes a projection that extends axially to the combustor bulkhead.

9. The assembly of claim 1, wherein the mounting strap includes one or more cooling apertures extending therethrough.

10. The assembly of claim 1, wherein a cooling channel extends laterally at least partially into the mounting lug and axially between the mounting lug and the combustor bulkhead.

11. The assembly of claim 1, further comprising:
    a second mounting strap attached to the combustor bulkhead;
    wherein the swirler includes a second mounting lug projecting radially out from the swirler body, and the second mounting lug is axially restrained between the combustor bulkhead and the second mounting strap.

12. The assembly of claim 1, further comprising a fuel injector mated with the swirler.

13. An assembly for a turbine engine, comprising:
    a combustor bulkhead including a shell and a heat shield attached to the shell by a plurality of fasteners; and
    a swirler including a mounting lug and a tubular swirler body extending along an axis, the mounting lug projecting radially out from the swirler body, the swirler being mated with an aperture in the combustor bulkhead, wherein the swirler is fixedly attached to the combustor bulkhead by one or more of the plurality of fasteners;
    a mounting strap attached to the combustor bulkhead by one or more of the plurality of fasteners;
    wherein the mounting lug is axially restrained between the mounting strap and the shell;
    wherein the mounting strap fixedly secures the swirler to the combustor bulkhead such that the tubular swirler body does not move in any direction relative to the combustor bulkhead.

14. The assembly of claim 13, wherein the plurality of fasteners comprise a plurality of heat shield studs.

15. An assembly for a turbine engine with a combustor bulkhead, comprising:
    a swirler including a mounting lug and a tubular swirler body extending along an axis, the mounting lug projecting radially out from the swirler body; and
    a mounting strap including an intermediate portion laterally between opposing end portions, the intermediate portion configured for axially restraining the mounting lug, and each of the opposing end portions configured for attaching to the combustor bulkhead;
    wherein the mounting strap is configured to be preloaded against the mounting lug thereby fixedly securing the swirler to the combustor bulkhead such that the tubular swirler body does not move in any direction relative to the combustor bulkhead.

16. The assembly of claim 15, further comprising:
    a second mounting strap including a second intermediate portion laterally between opposing second end portions, the second intermediate portion configured for axially restraining a second mounting lug, and each of the second opposing end portions configured for attaching to the combustor bulkhead;
    wherein the second mounting lug projects radially out from the swirler body.

17. The assembly of claim 15, wherein each of the opposing end portions is configured to receive a fastener.

18. The assembly of claim 15, further comprising one or more spacers configured for axially locating the mounting strap relative to the combustor bulkhead.

19. The assembly of claim 15, wherein the swirler includes an anti-rotation feature configured to engage the mounting strap.

* * * * *